(12) United States Patent
Cannata et al.

(10) Patent No.: US 6,915,021 B2
(45) Date of Patent: Jul. 5, 2005

(54) METHOD AND SYSTEM FOR SELECTIVE ENHANCEMENT OF IMAGE DATA

(75) Inventors: Philip E. Cannata, Austin, TX (US); Michael P. Keyes, Round Rock, TX (US); Jamie L. Kawabata, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 784 days.

(21) Appl. No.: 09/728,365

(22) Filed: Nov. 30, 2000

(65) Prior Publication Data

US 2001/0031084 A1 Oct. 18, 2001

Related U.S. Application Data

(60) Provisional application No. 60/172,529, filed on Dec. 17, 1999.

(51) Int. Cl.[7] .................................................. G06K 9/40
(52) U.S. Cl. ........................ 382/254; 382/162; 382/167
(58) Field of Search ................................ 382/162, 165, 382/167, 254; 358/518, 520

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/55 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |

(Continued)

FOREIGN PATENT DOCUMENTS

| | | | | |
|---|---|---|---|---|
| EP | 0 261 782 A2 | 8/1987 | | H04N/1/46 |
| EP | 0 422 220 A1 | 3/1989 | | A61B/6/03 |

(Continued)

OTHER PUBLICATIONS

Poynton, Charles A., *Frequently Asked Questions about Color*, www.inforamp.net/~poynton, ©Mar. 02, 1997 Charles A. Poynton.

Poynton, Charles A., *A Technical Introduction to Digital Video*, © 1996, John Wiley & Sons, Inc., Chapter 1 pp. 1–31 and Chapter 7 pp. 115–154.

(Continued)

*Primary Examiner*—Phuoc Tran
(74) *Attorney, Agent, or Firm*—Dinsomore & Shohl; David A. Norais

(57) ABSTRACT

A method and apparatus for selectively applying image enhancement processing to parts of an image. In one embodiment, spatial processing transformations, such as sharpening for example, are reduced or bypassed for pixels having color code values within a range known to be adversely affected by the spatial processing transformations. In another embodiment, color correction processing transformations are bypassed for pixels having color code values within a neutral color range. These neutral colors may have a gray-correction transformation applied in order to better separate the neutral colors from the other colors. According to another embodiment, color code values for pixels are transformed to two or more different color spaces. If a color correction transformation will have adverse affects on a pixel in one color space, corrected data from a different color space can be utilized for the pixel.

15 Claims, 7 Drawing Sheets

U.S. PATENT DOCUMENTS

| | | | |
|---|---|---|---|
| 4,026,756 A | 5/1977 | Stanfield et al. ............ 156/554 |
| 4,081,577 A | 3/1978 | Horner ...................... 427/424 |
| 4,142,107 A | 2/1979 | Hatzakis et al. ............ 250/571 |
| 4,215,927 A | 8/1980 | Grant et al. ................ 354/317 |
| 4,249,985 A | 2/1981 | Stanfield .................... 156/554 |
| 4,265,545 A | 5/1981 | Slaker ........................ 356/431 |
| 4,301,469 A | 11/1981 | Modeen et al. ............... 358/75 |
| 4,490,729 A | 12/1984 | Clark et al. ................... 346/75 |
| 4,501,480 A | 2/1985 | Matsui et al. ................ 354/298 |
| 4,564,280 A | 1/1986 | Fukuda ....................... 354/317 |
| 4,594,598 A | 6/1986 | Iwagami .................... 346/140 |
| 4,621,037 A | 11/1986 | Kanda et al. ................. 430/30 |
| 4,623,236 A | 11/1986 | Stella ......................... 354/318 |
| 4,633,300 A | 12/1986 | Sakai .......................... 358/41 |
| 4,636,808 A | 1/1987 | Herron ........................ 346/75 |
| 4,666,307 A | 5/1987 | Matsumoto et al. ......... 356/404 |
| 4,670,779 A | 6/1987 | Nagano ....................... 358/75 |
| 4,736,221 A | 4/1988 | Shidara ...................... 354/317 |
| 4,741,621 A | 5/1988 | Taft et al. .................... 356/376 |
| 4,745,040 A | 5/1988 | Levine ......................... 430/21 |
| 4,755,844 A | 7/1988 | Tsuchiya et al. ............ 354/317 |
| 4,777,102 A | 10/1988 | Levine ......................... 430/21 |
| 4,796,061 A | 1/1989 | Ikeda et al. ................... 355/73 |
| 4,814,630 A | 3/1989 | Lim ............................ 250/578 |
| 4,821,114 A | 4/1989 | Gebhardt ...................... 358/75 |
| 4,845,551 A | 7/1989 | Matsumoto .................. 358/80 |
| 4,851,311 A | 7/1989 | Millis et al. .................. 430/30 |
| 4,857,430 A | 8/1989 | Millis et al. .................. 430/30 |
| 4,875,067 A | 10/1989 | Kanzaki et al. ............. 354/325 |
| 4,969,045 A | 11/1990 | Haruki et al. ............... 358/228 |
| 4,994,918 A | 2/1991 | Lingemann |
| 5,027,146 A | 6/1991 | Manico et al. .............. 354/299 |
| 5,034,767 A | 7/1991 | Netz et al. .................. 354/317 |
| 5,101,286 A | 3/1992 | Patton ........................ 358/487 |
| 5,124,216 A | 6/1992 | Giapis et al. ................. 430/30 |
| 5,155,596 A | 10/1992 | Kurtz et al. ................. 358/214 |
| 5,196,285 A | 3/1993 | Thomson .................... 430/30 |
| 5,200,817 A | 4/1993 | Birnbaum .................... 358/80 |
| 5,212,512 A | 5/1993 | Shiota ........................ 354/319 |
| 5,231,439 A | 7/1993 | Takahashi et al. .......... 354/313 |
| 5,235,352 A | 8/1993 | Pies et al. ................... 346/140 |
| 5,255,408 A | 10/1993 | Blackman .................... 15/308 |
| 5,266,805 A | 11/1993 | Edgar |
| 5,267,030 A | 11/1993 | Giorgianni et al. .......... 358/527 |
| 5,292,605 A | 3/1994 | Thomson .................... 430/30 |
| 5,296,923 A | 3/1994 | Hung ......................... 358/527 |
| 5,334,247 A | 8/1994 | Columbus et al. ........... 118/411 |
| 5,350,651 A | 9/1994 | Evans et al. .................. 430/21 |
| 5,350,664 A | 9/1994 | Simons ....................... 430/362 |
| 5,357,307 A | 10/1994 | Glanville et al. ............ 354/324 |
| 5,360,701 A | 11/1994 | Elton et al. .................. 430/501 |
| 5,371,542 A | 12/1994 | Pauli et al. .................. 348/262 |
| 5,391,443 A | 2/1995 | Simons et al. ............... 430/21 |
| 5,414,779 A | 5/1995 | Mitch ......................... 382/199 |
| 5,416,550 A | 5/1995 | Skye et al. .................. 354/298 |
| 5,418,119 A | 5/1995 | Simons ....................... 430/507 |
| 5,418,597 A | 5/1995 | Lahcanski et al. ............ 355/75 |
| 5,432,579 A | 7/1995 | Tokuda ....................... 354/293 |
| 5,436,738 A | 7/1995 | Manico ....................... 358/503 |
| 5,440,365 A | 8/1995 | Gates et al. ................. 354/298 |
| 5,447,811 A | 9/1995 | Buhr et al. ................... 430/20 |
| 5,448,380 A | 9/1995 | Park |
| 5,452,018 A | 9/1995 | Capitant et al. |
| 5,465,155 A | 11/1995 | Edgar ......................... 358/500 |
| 5,477,345 A | 12/1995 | Tse ............................ 358/500 |
| 5,496,669 A | 3/1996 | Pforr et al. ................... 430/22 |
| 5,516,608 A | 5/1996 | Hobbs et al. .................. 430/30 |
| 5,519,510 A | 5/1996 | Edgar |
| 5,546,477 A | 8/1996 | Knowles et al. ............ 382/242 |
| 5,550,566 A | 8/1996 | Hodgson et al. ............ 345/202 |
| 5,552,904 A | 9/1996 | Ryoo et al. |
| 5,563,717 A | 10/1996 | Koeng et al. ............... 358/406 |
| 5,568,270 A | 10/1996 | Endo .......................... 358/298 |
| 5,576,836 A | 11/1996 | Sano et al. .................. 358/302 |
| 5,581,376 A | 12/1996 | Harrington .................. 358/518 |
| 5,587,752 A | 12/1996 | Petruchik .................... 396/315 |
| 5,596,415 A | 1/1997 | Cosgrove et al. ........... 358/296 |
| 5,627,016 A | 5/1997 | Manico ....................... 430/434 |
| 5,649,260 A | 7/1997 | Wheeler et al. ............. 396/569 |
| 5,664,253 A | 9/1997 | Meyers ....................... 396/603 |
| 5,664,255 A | 9/1997 | Wen ............................ 396/627 |
| 5,667,944 A | 9/1997 | Reem et al. ................. 430/359 |
| 5,678,116 A | 10/1997 | Sugimoto et al. ........... 396/611 |
| 5,691,118 A | 11/1997 | Haye .......................... 430/357 |
| 5,695,914 A | 12/1997 | Simon et al. ................ 430/379 |
| 5,698,382 A | 12/1997 | Nakahanada et al. ....... 430/418 |
| 5,726,773 A | 3/1998 | Mehlo et al. ................ 358/474 |
| 5,739,897 A | 4/1998 | Frick et al. ................... 355/40 |
| 5,771,107 A | 6/1998 | Fujimoto et al. ............ 358/464 |
| 5,781,315 A * | 7/1998 | Yamaguchi .................. 358/520 |
| 5,790,277 A | 8/1998 | Edgar |
| 5,835,795 A | 11/1998 | Craig et al. ..................... 396/6 |
| 5,835,811 A | 11/1998 | Tsumura ..................... 396/598 |
| 5,870,172 A | 2/1999 | Blume ......................... 355/27 |
| 5,880,819 A | 3/1999 | Tanaka et al. ................ 355/75 |
| 5,892,595 A | 4/1999 | Yamakawa et al. ......... 358/530 |
| 5,930,388 A | 7/1999 | Murakami et al. |
| 5,959,720 A | 9/1999 | Kwon et al. .................. 355/38 |
| 5,963,662 A | 10/1999 | Vachtsevanos et al. ..... 382/150 |
| 5,966,465 A | 10/1999 | Keith et al. ................. 385/232 |
| 5,979,011 A | 11/1999 | Miyawaki et al. ............ 15/308 |
| 5,982,936 A | 11/1999 | Tucker et al. ............... 382/233 |
| 5,982,937 A | 11/1999 | Accad ........................ 382/239 |
| 5,982,941 A | 11/1999 | Loveridge et al. .......... 382/260 |
| 5,982,951 A | 11/1999 | Katayama et al. .......... 382/284 |
| 5,988,896 A | 11/1999 | Edgar ......................... 396/604 |
| 5,991,444 A | 11/1999 | Burt et al. ................... 382/232 |
| 5,998,109 A | 12/1999 | Hirabayashi ................. 430/434 |
| 6,000,284 A | 12/1999 | Shin et al. .................... 73/150 |
| 6,005,987 A | 12/1999 | Nakamura et al. .......... 382/294 |
| 6,065,824 A | 5/2000 | Bullock et al. ................ 347/19 |
| 6,069,714 A | 5/2000 | Edgar ......................... 358/487 |
| 6,088,084 A | 7/2000 | Nishio .......................... 355/75 |
| 6,089,687 A | 7/2000 | Helterline ....................... 347/7 |
| 6,101,273 A | 8/2000 | Matama ...................... 382/169 |
| 6,102,508 A | 8/2000 | Cowger ........................... 347/7 |
| 6,137,965 A | 10/2000 | Burgeios et al. ............ 396/626 |
| 6,200,738 B1 | 3/2001 | Takano et al. .............. 430/362 |
| 6,603,878 B1 * | 8/2003 | Takemoto ................... 382/167 |
| 6,618,079 B1 * | 9/2003 | Higuchi ...................... 382/162 |

FOREIGN PATENT DOCUMENTS

| | | | |
|---|---|---|---|
| EP | 0 482 790 B1 | 9/1991 | ............ H04N/1/40 |
| EP | 0 525 886 A3 | 7/1992 | ............ G03D/5/00 |
| EP | 0 580 293 A1 | 6/1993 | ............ H04N/1/04 |
| EP | 0 580 293 A1 | 1/1994 | ............ H04N/1/04 |
| EP | 0 601 364 A1 | 6/1994 | .......... H04N/1/387 |
| EP | 0 669 753 A2 | 2/1995 | .......... H04N/1/407 |
| EP | 0 794 454 A2 | 2/1997 | ........... G03B/27/73 |
| EP | 0 768 571 A2 | 4/1997 | ........... G03D/13/00 |
| EP | 0 806 861 A1 | 11/1997 | ............ H04N/1/00 |
| EP | 0 878 777 A2 | 11/1998 | ............ G06T/5/40 |
| EP | 0 930 498 A2 | 12/1998 | ........... G01N/21/88 |
| WO | WO 90/01240 | 2/1990 | ............ H04N/1/40 |
| WO | WO 91/09493 | 6/1991 | ........... H04N/5/217 |
| WO | WO 97/25652 | 7/1997 | ............ G03D/5/00 |
| WO | WO 9743613 | 11/1997 | |
| WO | WO 98/19216 | 5/1998 | ............ G03C/5/29 |
| WO | WO 9825399 | 6/1998 | |
| WO | WO 98/25399 | 6/1998 | ............ H04N/1/38 |
| WO | WO 9831142 | 7/1998 | |

| | | | | |
|---|---|---|---|---|
| WO | WO 93/34157 | 8/1998 | | |
| WO | WO 98/34157 | 8/1998 | | |
| WO | WO 9834397 | 8/1998 | | |
| WO | WO 99/43148 | 8/1999 | ............ | H04N/1/00 |
| WO | WO 99/43149 | 8/1999 | ............ | H04N/1/10 |
| WO | WO 01/01197 | 1/2001 | ............ | G03D/5/00 |
| WO | WO 01/13174 A1 | 2/2001 | ............ | G03D/5/06 |
| WO | WO 01/45042 A1 | 6/2001 | ............ | G06T/5/00 |
| WO | WO 01/50192 A1 | 7/2001 | ............ | G03C/7/407 |
| WO | WO 01/50193 A1 | 7/2001 | ............ | G03C/7/407 |
| WO | WO 01/50194 A1 | 7/2001 | ............ | G03C/7/407 |
| WO | WO 01/50197 A1 | 7/2001 | ............ | G03C/7/42 |
| WO | WO 01/52556 A2 | 7/2001 | ............ | H04N/9/11 |

OTHER PUBLICATIONS

"Adaptive Fourier Threshold Filtering: A Method to Reduce Noise and Incoherent Artifacts in High Resolution Cardiac Images", Doyle, M. et al., 8306 Magnetic Resonance in Medicine 31, No. 5, Baltimore, MD, May, pp. 546–550, 1994.

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

| PIXEL NUMBER | COLOR | BACK | FRONT | THROUGH |
|---|---|---|---|---|
| 1 | a | $b_a$ | $f_a$ | $t_a$ |
| 2 | a | $b_a$ | $f_a$ | $t_a$ |
| 3 | b | $b_b$ | $f_b$ | $t_b$ |
| 4 | b | $b_b$ | $f_b$ | $t_b$ |
| 5 | b | $b_b$ | $f_b$ | $t_b$ |
| 6 | c | $b_c$ | $f_c$ | $t_c$ |
| 7 | c | $b_c$ | $f_c$ | $t_c$ |
| 8 | c | $b_c$ | $f_c$ | $t_c$ |
| 9 | b | $b_b$ | $f_b$ | $t_b$ |
| 10 | d | $b_d$ | $f_d$ | $t_d$ |

FIG. 4A

| PIXEL NUMBER | COLOR | BACK | FRONT | THROUGH |
|---|---|---|---|---|
| 1 | a | $b_a + \Delta_1$ | $f_a + \Delta_2$ | $t_a + \Delta_3$ |
| 2 | a | $b_a + \Delta_4$ | $f_a + \Delta_5$ | $t_a + \Delta_6$ |
| 3 | b | $b_b$ | $f_b$ | $t_b$ |
| 4 | b | $b_b$ | $f_b$ | $t_b$ |
| 5 | b | $b_b$ | $f_b$ | $t_b$ |
| 6 | c | $b_c + \Delta_7$ | $f_c + \Delta_8$ | $t_c + \Delta_9$ |
| 7 | c | $b_c + \Delta_{10}$ | $f_c + \Delta_{11}$ | $t_c + \Delta_{12}$ |
| 8 | c | $b_c + \Delta_{13}$ | $f_c + \Delta_{14}$ | $t_c + \Delta_{15}$ |
| 9 | b | $b_b$ | $f_b$ | $t_b$ |
| 10 | d | $b_d + \Delta_{16}$ | $f_d + \Delta_{17}$ | $t_d + \Delta_{18}$ |

FIG. 4b

| 1 ($L_1$, $a_1$, $b_1$) | 2 ($L_2$, $a_2$, $b_2$) | 3 ($L_3$, $a_3$, $b_3$) | 4 ($L_4$, $a_4$, $b_4$) |
|---|---|---|---|
| 5 ($L_5$, $a_5$, $b_5$) | 6 ($L_6$, $a_6$, $b_6$) | 7 ($L_7$, $a_7$, $b_7$) | 8 ($L_8$, $a_8$, $b_8$) |
| 9 ($L_9$, $a_9$, $b_9$) | 10 ($L_{10}$, $a_{10}$, $b_{10}$) | 11 ($L_{11}$, $a_{11}$, $b_{11}$) | 12 ($L_{12}$, $a_{12}$, $b_{12}$) |
| 13 ($L_{13}$, $a_{13}$, $b_{13}$) | 14 ($L_{14}$, $a_{14}$, $b_{14}$) | 15 ($L_{15}$, $a_{15}$, $b_{15}$) | 16 ($L_{16}$, $a_{16}$, $b_{16}$) |
| 17 ($L_{17}$, $a_{17}$, $b_{17}$) | 18 ($L_{18}$, $a_{18}$, $b_{18}$) | 19 ($L_{19}$, $a_{19}$, $b_{19}$) | 20 ($L_{20}$, $a_{20}$, $b_{20}$) |

# METHOD AND SYSTEM FOR SELECTIVE ENHANCEMENT OF IMAGE DATA

This application claims the benefit of U.S. Provisional Application No. 60/172,529, filed Dec. 17, 1999, the disclosure of which is hereby incorporated herein by reference.

TECHNICAL FIELD

The present invention relates generally to digital image processing, and more particularly to a method and system for selective enhancement of image data.

BACKGROUND OF THE INVENTION

Digital imaging systems, such as scanners, digital cameras, and digital film processing systems, have been developed to create digital representations of images or scenes. Typically, the image or scene is represented as an array of pixels, each pixel being assigned one or more numerical values which describe the color of the part of the image or scene which the pixel represents.

For a scanner, the image which is scanned may reside on any of a variety of media, including photographs, documents, slides, and film. Typically, the digital encoding process used by a scanner involves illuminating the image with a light source and recording the type and/or amount of reflected or transmitted light.

As an example, a negative image on film can be scanned by transmitting a beam of white light through the film. In the case of color film, the light passing through the film is attenuated by individual dye layers. For each pixel, the transmitted light is passed through red, green, and blue filters, so as to describe the pixel in terms of its red, green, and blue characteristics. Such an RGB coding system is referred to as a direct coding system, because each of the R, G, and B components (the color code values) for a pixel directly represents the respective R, G, or B component of the overall color for the pixel. Similar scanning methods using R, G, and B filters can be used for scanning of paper images and photographs, except that reflected light, rather than transmitted light, is recorded by the filters.

In addition to direct coding systems, indirect coding systems, such as those utilized in digital film processing, have also been developed. Color film generally comprises three layers of light sensitive material that are separately sensitive to red, green, and blue light. During development, a light source is directed to the front of the film, and a light source is directed to the back of the film. Grains of elemental silver developing in the top layer (e.g., the blue sensitive layer) are visible from the front of the film by light reflected from the front source; however, these grains are hidden from the back of the film. Similarly, grains of elemental silver developing in the bottom layer (e.g., the red sensitive layer) are visible from the back of the film by light reflected from the back source; however these grains are hidden from the front. Meanwhile, elemental silver grains in the middle layer (e.g., the green sensitive layer) are hidden from the light reflected from the front or back; however, these grains are visible by any light transmitted through the three layers, as are those grains in the other two layers. Thus, by sensing, for each pixel location, light reflected from the front of the film, light reflected from the back of the film, and light transmitted through the film, three measurements can be acquired for each pixel. The three measured numbers for each pixel can then be solved for the three colors to arrive at color code values for each pixel. The color code values assigned to each pixel correspond to a particular location in the selected geometrical representation of the possible colors (i.e., in the selected "color space"). A variety of color spaces have been developed for representing colors, including the L*a*b* color space, and the RGB color space, for example, and transformations have been developed for converting between various color spaces.

Once the image data is captured, either by direct or indirect coding, the image data representing the image comprises pixel color code values, which may be manipulated, modified, displayed, printed, and/or stored. Signal processing operations are typically employed to modify or format the image data into a usable form. For example, to view the image on a monitor, the data is usually required to be in an RGB color code format. When making a transformation from the data capture format, or color space, to the desired output format for the specific output device, a conventional calorimetric transformation is often used to translate the data to a standard encoding space, or to standard calorimetric values.

During such transformations, additional modifications may also be made to the pixel color code values to deliberately alter the color or appearance of the output images from that which otherwise would have been produced using the original data. For example, spatial processing, such as sharpening or noise reduction, can be utilized to enhance the image quality. Moreover, color correction processes may be utilized in which correction coefficients are calibrated by scanning in a medium having known color patches and comparing the color difference between the captured code values and the known code values. Color correction equations, matrices, and/or look-up tables can then be established to carry out the color correction on images which are subsequently captured.

While many such image enhancement transformations are beneficial, a disadvantage of conventional transformations is that portions of the color space may be adversely affected by such transformations. In particular, it has been found that spatial processing often adversely affects pixels of particular color code values (pixels which have color code values which lie in particular locations of the color space) while enhancing others. Another disadvantage in some implementations is that color correction processing may adversely affect achromatic (neutral) pixels. Yet another disadvantage in some implementations is that color correction processes may adversely affect pixel code values which represent a color in one color space, but not pixel code values which represent the same color in another color space.

SUMMARY OF THE INVENTION

According to one embodiment of the invention, light is applied to a medium which includes an image. Color code values are obtained for each of a plurality of pixels by detecting light reflected and/or transmitted from the medium, and it is determined whether a pixel has a color code value which falls within a predetermined range. The predetermined range had been identified as being adversely affected by an image enhancement transformation. The image enhancement transformation is applied to the pixel only if the pixel does not have a color code value which falls within the range. If the pixel does have a color code value within the range, a different transformation may be applied, or no transformation may be applied.

An advantage of at least one embodiment of the invention is that pixels having color code values which may be adversely affected by an image enhancement transformation are sequestered so as to avoid the adverse affects of image enhancement transformations.

Another advantage of at least one embodiment of the invention is that the pixels which fall in the range can be processed according to a separate enhancement transformation, such that the adverse effects are avoided and yet the color quality of the pixel is still enhanced.

Still other advantages of various embodiments will become apparent to those skilled in this art from the following description wherein there is shown and described preferred embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which like reference numerals indicate corresponding structure throughout the figures.

FIGS. 4a and 4b are tables illustrating example pixel code values before and after applying a biased spatial processing operation, according to an embodiment of the invention;

DETAILED DESCRIPTION OF PREFERRED EMBODIMENTS

In general, the present invention relates to a method and apparatus for selectively applying image enhancement transformations to certain pixels which make up an image data file, and to refrain from applying the transformations to other pixels in the file. In one embodiment, spatial processing transformations are avoided for pixels of particular colors which are known to be adversely affected by the spatial processing transformations. In another embodiment, color correction transformations are avoided for pixels which are neutral colors, or achromatic. These neutral colored pixels can have a separate gray-correction transformation applied in order to better separate the neutral colored pixels from the pixels of other colors. According to another embodiment, color code values for pixels are provided in a first color space. If a color correction transformation will have adverse affects on particular pixels in the first color space, then the color code values for those particular pixels are transformed to a second color space. Then, a first color correction transformation is applied to the pixels which are in the first color space, and a separate color correction transformation is applied to those pixels which are in the second color space.

Figure 1:
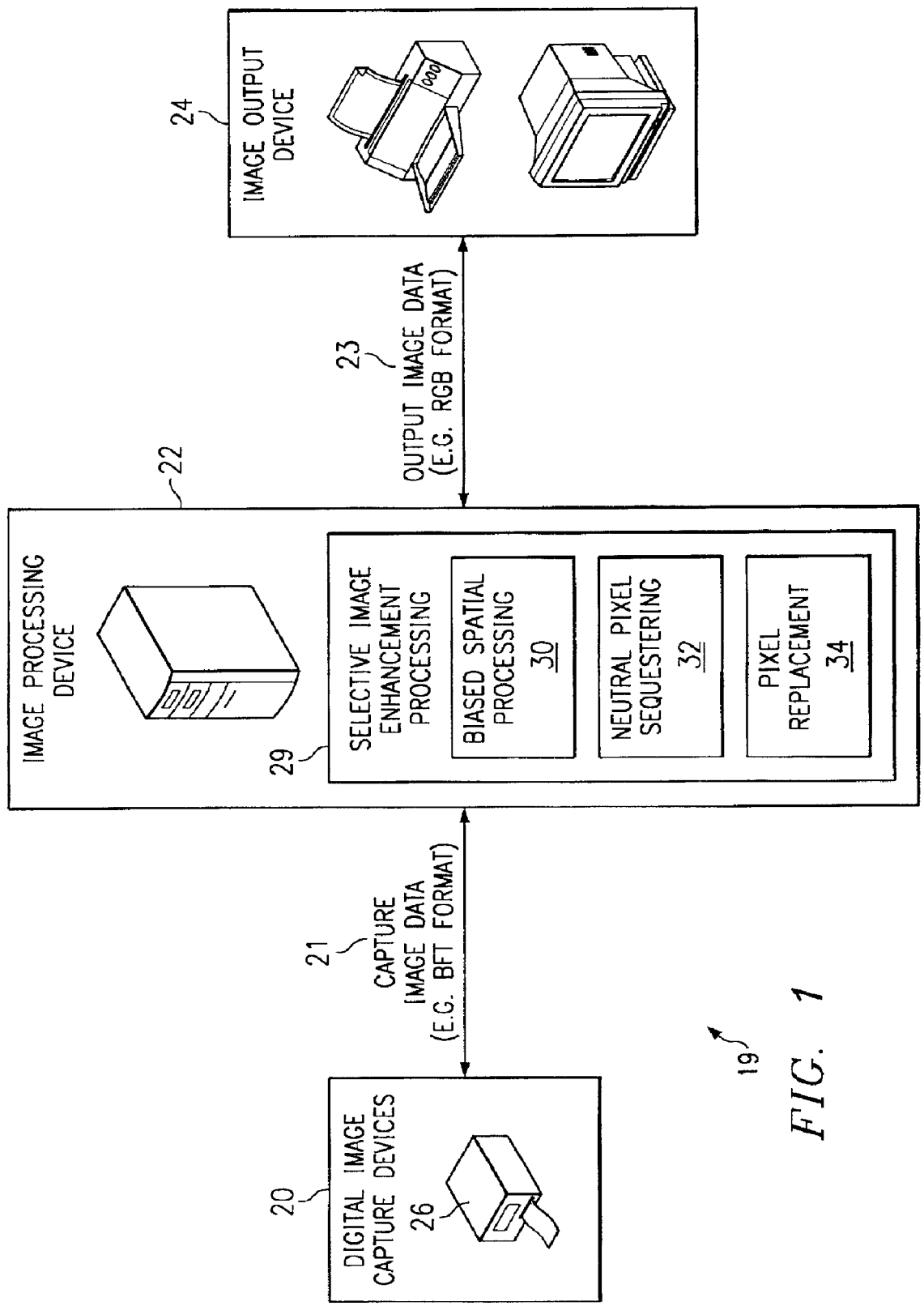
FIG. 1 illustrates an embodiment of a color imaging system which includes selective image enhancement capability, according to principles of the present invention.

Turning now to the drawings in detail, FIG. 1 illustrates an embodiment of a color imaging system 19 which includes selective image enhancement capability, according to principles of the present invention. In this embodiment, the system 19 includes a digital image capture device 20, an image processing device 22, and an image output device 24.

The image capture device 20 may comprise any device or system which produces or receives a digital image. For example, image capture device 20 may comprise an image scanner, digital camera, digital film processing system or other suitable image capture system. To store the digital representation, a computer readable medium may be used, such as a magnetic storage device, an optical storage device, or an electronic storage device.

The digital image capture device 20 is in communication with an image processing device 22 and provides the digital image data, in its captured format, to the image processing device 22. The image processing device 22 may be embodied as an internal or external computer system which generally includes a central processing unit and a memory, and which is capable of processing data in accordance with one or more instructions. For example, the image processing device 22 may comprise a personal computer, workstation, server, mainframe, microcontroller, or the like. Although shown in FIG. 1 as separate from the image capture device 20, the image processing device 22 can be incorporated integrally with the image capture device and/or with the image output device 24.

The image processing device 22 processes the data representation of the captured image data file 21 which is received from the image capture device 20 and which represents the captured image. One of the functions of the image processing device 22 is to transform the data 21 from the captured format to output image data 23 for the desired output device 24. To achieve this function, the signal processing which is carried out in the image processing device 22 typically includes a calorimetric transformation to translate the captured image data 21 to a standard encoding format, or to standard colorimetric values. For example, it is often desirable to transform from the captured format to a perceptually uniform color space, such as the CIE L*a*b* color space, or the CIE L*u*v* color space. Because these two color spaces are based upon the CIE XYZ color space, it may be required to transform to the CIE XYZ color space to eventually arrive at the perceptually uniform color space. One advantage of perceptually uniform spaces is that a small perturbation to a component color value in such a space is approximately equally perceptible across the entire range of that value. Equations are known in the art for transforming to and from a perceptually uniform color space.

The image processing device 22 may also make color transformations to the image data, preferably while it is in one of the perceptually uniform formats, but potentially while it is in other formats. For example, it may be desirable to perform a color gamut correction in order to account for discrepancies between input-image viewing conditions and encoding reference viewing conditions for the particular color capture format which is utilized. Such a color gamut correction can be achieved by adjusting each pixel code value with respect to some standard reference colors. For example, in a film scanning application, a target image with specific color patches can be recorded on photographic film and scanned in the capture format. The pixel code values can then be transformed to a uniformly perceptible color space, such as the L*a*b* color space. Then, the pixel code value averages (or means) for each of the patches can be calculated, and a matrix can be calculated for regressing the average values against those which are known for the patches. The matrix can then be applied to every pixel code for every image processed thereafter in order to achieve color gamut correction.

Figures 9, 10:
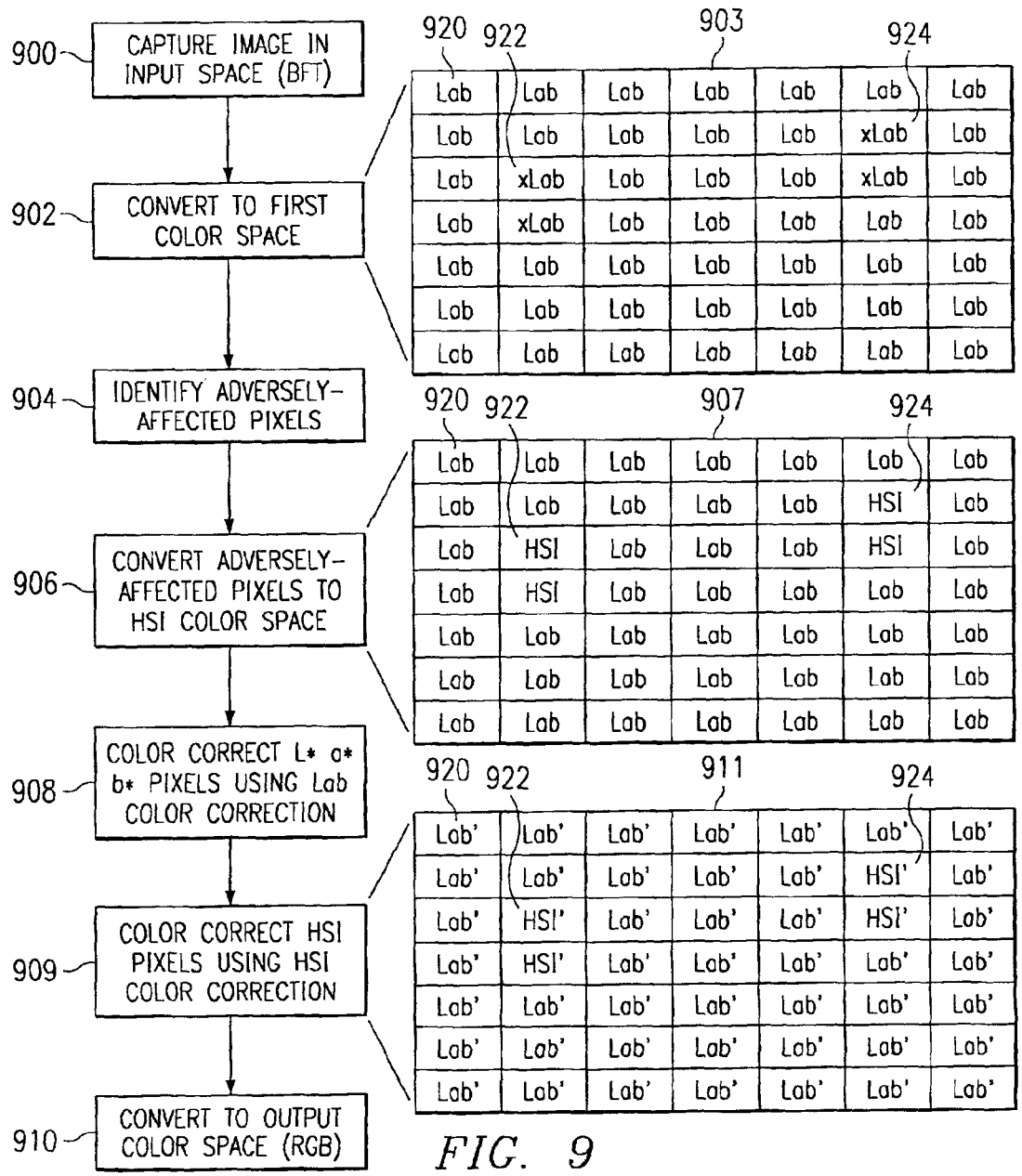
FIG. 9 is a flow diagram illustrating a method of converting captured image data to a first color space, identifying adversely-affected pixels in the first color space and converting them to a second color space, and conducting color correction in the two color spaces, according to another embodiment of the present invention.
FIG. 10 is an exemplary pixel map representing an image, each pixel having color code values in the L*a*b* space.

In addition to color transformations, the image processing device 22 may also have the capability to perform other image enhancing transformations, such as spatial processing transformations for example. Any operation which involves adjusting a pixel code value based upon the code values for one or more neighboring pixels is referred to herein as a spatial transformation or spatial processing. For example, FIG. 10 shows an exemplary pixel array representing a portion of an image. Performing a spatial transformation on pixel 10 might involve adjusting the $L_{10}$, $a_{10}$, and/or $b_{10}$ value for pixel 10 based upon the three L, a, and b values for pixels 5, 6, 7, 9, 11, 13, 14 and/or 15. Two exemplary types of spatial transformations are sharpening and noise reduction. Such transformations involve, for each particular pixel, averaging the pixel code values for a given number of pixels surrounding the particular pixel, and using the average to adjust the pixel code value for that particular pixel.

However, according to principles of the present invention, the image processing device 22 includes capability to conduct image enhancement transformations, such as color correction transformations and/or spatial processing transformations, on a selective basis, depending on the pixel code value for the given pixel. In the embodiment of FIG. 1, three such selective image enhancement functions 29 are provided: biased spatial processing 30, neutral pixel sequestering 32, and pixel replacement 34. One or more of these three types of image enhancement functions 29 can be conducted on the captured image data 21 before outputting the output image date 23 to the output formation device 24.

The biased spatial processing function 30 of this embodiment applies spatial processing to the image data. However, rather than applying the spatial processing to all of the pixels which represent the image, the spatial processing is only applied to the pixels which meet a certain select criteria. In this way, the spatial processing is biased to include or exclude pixels.

Preferably, pixels are selected by the biased spatial processing function 30 based upon the location of the pixel code values in the color space which is utilized. In other words, it is preferred that a pixel is selected based upon whether its code values represent a point that falls within a range of locations in the color space (i.e, a range of colors) which has been determined to be adversely affected by spatial processing. More specifically, if three code values are used to represent the color for that pixel, than those three values represent a particular point in a three-dimensional color space. The position of that particular point in the color space will determine whether the biased spatial processing function 30 applies a spatial transformation to that pixel.

For example, it has been found that sharpening can increase image noise, and that an increase in image noise can be more apparent in some colors than in others. For instance, image noise can be particularly noticeable in yellows in digital film processing. The biased spatial processing function 30 can discriminate the yellow pixels and not have the particular spatial process (such as sharpening) applied to them, even though it is applied to the non-yellow pixels.

A number of methods can be utilized for achieving biased spatial processing. For instance, the spatial processing can be applied on a pixel-by-pixel basis, and for those pixels with color code values within the predetermined range or ranges, the spatial processing will not be applied and will skip to the next pixel.

In addition, rather than applying no spatial processing to the select pixels, it may be desirable to reduce the spatial processing applied to these pixels, by applying a different type of spatial processing to them. Thus, some of the benefits of spatial processing can be achieved for these pixels, yet the adverse effects (e.g., image noise) will be minimized.

The image processing device 22 may also include a neutral pixel sequestering function 32. While image enhancement transformations, such as color correction transformations, may provide good results for colored pixels, such transformations may adversely affect achromatic, or neutral pixels. For example, gray pixels, after color correction, can appear tinted toward green or magenta. However, the neutral pixel sequestering function 32 identifies the pixels that are supposed to be neutral, by selecting those pixels having a color code value within a range that is near the neutral color code values. These select pixels then either be excluded from the color correction transformation, or can be processed differently according to a special corrective transformation which ensures that the neutral pixels appear even more neutral. Accordingly, the best color correction processing is achieved without adverse affects to the neutral pixels. The color correction transformation can be performed on a pixel-by-pixel basis, with the neutral pixels being skipped, or can be performed to the entire pixel set, with neutral pixels later being replaced with their original values or with separately processed values.

The embodiment of FIG. 1 also preferably includes a pixel replacement function 34. The pixel replacement function 34 preferably applies color correction transformations to the pixel code values in two separate color spaces. In digital film processing applications, color correction transformations conducted in one color space may adversely affect some pixels while the same color correction transformations conducted in a separate color space may not adversely affect these pixels (but may adversely affect different pixels). Accordingly, the pixel replacement function 34 of this embodiment transforms the image data to a first color space and conducts a first color correction transformation in this first color space. Prior to the first transformation, the adversely-affected pixels from the first space are identified and replaced with corresponding color code values from a second color space. A second color correction transformation is then conducted for these identified pixels in the second color space. Accordingly, a combined set of code values results for the image, some pixel code values being in the first color space (and having the first transformation applied to them) and some pixel code values being in the second color space (and having the second transformation applied to them). This combined set minimizes the number of adversely-affected pixels, and thereby minimizes the adverse affects of the first color correction transformation.

Alternatively, color correction can be conducted on the entire image data set in two separate color spaces. Then, a combined set can be formed from the two color spaces after the color correction, the combined set comprising some pixels having code values from the first color space and other pixels having code values from the second color space. Whether the color code values for a given pixel are chosen from the first or the second color space is determined by whether the color represented by the code values has been adversely affected by the color correction transformation in either of the two spaces.

The combined set of code values can then be converted to the final output format, according to a suitable transformation from the first space to the output format (for those pixels having code values in the first space) and according to a suitable transformation from the second space to the output format (for those pixels having code values in the second space.) Thus, this pixel replacement function 34 ensures that all areas of an image are adequately color corrected by replacing a pixel's code values in an adversely-affected color space with corresponding pixel code values from a separate color space and applying a color correction transformation in that separate color space.

Once image processing has been completed by the processing device 22, the device can transform the image data to the image output data 23 required by the image output device 24. Any suitable transformation from the color space in which the processing took place prior to the final output format may be utilized. The transformed image can then be produced in the image output device 24 (such as a printer, monitor, and the like).

Figure 2:
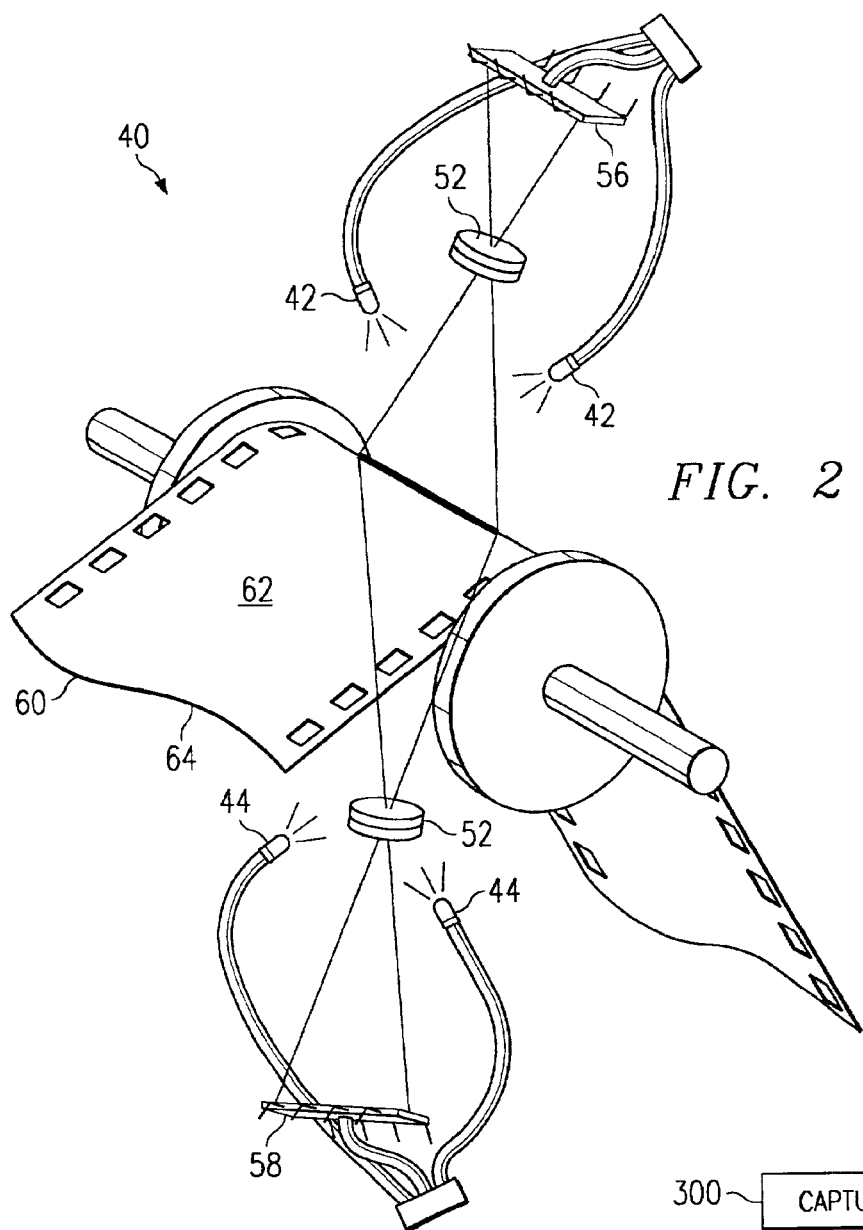
FIG. 2 illustrates a digital film scanning operation which can be used to capture images in the system of FIG. 1.

FIG. 2 illustrates one embodiment of a digital film processing system 40, which may be used as the image capture device 20 of the system of FIG. 1. The digital film processing system 40 of this embodiment comprises a front light source 42 and a back light source 44, each being configured to apply infrared light to a film 60 having a developing image formed thereon. Additional optics may be positioned between each of the light sources 42 and 44 and the film 60 in order to enhance the illumination provided, such as to make the illumination more uniform for example. Preferably, the light sources 42 and 44 apply infrared light to the film 60. The front light source 42 applies light to the front 62 of the film 60, and the back light source 44 applies light to the back 64 of the film 60. Any appropriate infrared light source may be utilized for this purpose, such as infrared light-emitting diodes (LED's), emitters, and/or photodiodes for example. Filters or wavelength modifiers or limiters may be included with the light sources 42 and 44 to aid them in applying visible light to the film 60. Light applied to the film 60 by the sources 42 and 44 is attenuated by the elemental silver grains that are forming the image. A pair of sensors, 56 and 58, are provided in order to record the amount and/or type of reflected and/or transmitted light. Optics, such as lenses 52 may also be provided in order to focus or otherwise direct the light reflected by and/or transmitted through the image onto the sensors 56 and 58.

The film 60 generally comprises a clear film base and three photo-sensitive layers which are separately sensitive to different light wavelengths, such as red, blue and green for example. During development of the film 60, the light sources 42 and 44 project light to the front 62 and the back 64 of the film respectively. For each portion of the image, or "pixel", sensor 56 captures light reflected from the front 62 of the film 60, and sensor 58 captures light reflected from the back 64 of the film 60. Light from front light source 42 which transmits through the film 60 is also captured by sensor 58, and light from light source 44 which transmits through the film is also captured by sensor 56. Accordingly, four code values for each pixel can be obtained: the amount of reflected light sensed by the back sensor 58, the amount of transmitted light sensed by the back sensor 58, the amount of reflected light sensed by the front sensor 56, and the amount of transmitted light sensed by the front sensor 56. Often, only the transmitted light from one of the light sources is utilized in the image data, such as the amount of light transmitted by the source 44 and sensed by the front sensor 56. The light sources 42 and 44 are generally alternately illuminated when acquiring the image data. In addition, a complete set of image data comprising pixel color code values may be taken during multiple development times of the film 60, such that various features of the image are recorded. The multiple sets of pixel code values can then be combined to form a signal enhanced image data set.

The sensors 56 and 58 utilized in this embodiment could comprise any suitable light responsive sensor, such as a phototransistor, a photoresistor, a charge coupled device (CCD), a time delay integration array, or other light responsive device. A plurality of individual sensor elements may be arranged in an array to scan a region or line or column of the image with one illumination.

It may also be desirable to utilize analog-to digital convertors (A/D convertors) to convert the data from the sensors 56 and 58 into digital data, and to utilize pre-processor circuitry to convert the digital data before image processing begins. Generally the acquired digital data comprises three numeric values (B, F, and T) for each pixel in the image, the three values corresponding to the back reflected light intensity (B), front reflected light intensity (F), and the transmitted light intensity (T). By sensing light reflected from the front and the back of the film, and light transmitted through the film, each pixel in the film yields three measured numbers that may be solved for the three colors, such as by using a matrix transformation as described in U.S. Pat. No. 5,519,510 for example, which is hereby incorporated herein by reference. Once solved for the three colors, one or more of selective image enhancement processes (such as the biased spatial processing function 30, neutral pixel sequestering function 32, and/or pixel replacement function 34) can be applied using an image processing device 22. These processes may be carried out in one or more color spaces. A final conversion to the output format may be required once image processing is complete.

Figure 3:
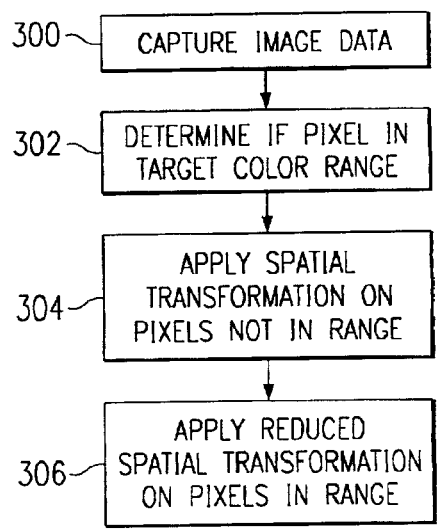
FIG. 3 is a flow diagram illustrating a method for selectively applying spatial processing to captured image data, according to one embodiment of the present invention.

FIG. 3 is a flow diagram illustrating a method for applying biased spatial transformations to captured image data, according to another embodiment of the present invention. According to this embodiment, the pixel code values are captured at step 300.

Then, at step 302, it is determined which pixels have code values which are within a target color range which is known to be adversely affected by the spatial transformation to be conducted. For example, sharpening can have an adverse effect on yellows, so it may be desirable to avoid applying sharpening to pixels having code values within the yellow range. One way to achieve this step would be to compare the pixel code values for the pixel with the range of code values which define yellow colors, and, if the pixel code value falls within the range, to identify the pixel as being within the range. For example, the pixel code values can be transformed into L*a*b* space. Then, yellow pixels can be discriminated by determining whether the a* and b* values for the pixel fall within the a* and b* ranges within which all yellows will fall. (In L*a*b* color space, the a* and b* values specify the color.) In particular, pixels having a* values of around zero and b* values of greater than 70 can be selected. Alternatively, the pixels can be transformed into a color space that has cylindrical coordinates, such as the HSI (Hue, Saturation, and Intensity) color space. The first value, hue (H), is an angle from 0–360 degrees, and this single values specifies the color of the pixel in the HSI color space. Thus, any target color, such as yellow, can be readily identified by comparing the H value for the pixel to a pre-determined range of hue angles which represent the target color.

Once pixels residing in the target color range(s) are identified, step 304 can be executed. At this step, the spatial transformation operation is performed on the pixels which are not in the target color range (s). For example, pixels which have been marked as falling within the yellow range can be excluded from the spatial transformation. Alternatively, if the transformation operation is performed on these pixels, the transformation operation can be reversed, such as by returning the pixel code values for these pixels to their original values.

As another alternative, a different spatial transformation can be conducted on these pixels. This step is shown as step 306 in the embodiment of FIG. 3. At this step, a reduced spatial transformation is performed on the pixels in the range, such that the pixel code values for these pixels are not changed as much as would have occurred if the spatial transformation of block 304 had been conducted on them. Accordingly, less noise will be introduced into the code values for these pixels.

FIGS. 4a and 4b are data tables which provide an example of how pixel data might change during a biased spatial transformation operation, such as the transformation discussed with respect to FIG. 3. As shown in these figures, a plurality of pixels 400 are provided in a data image file to represent the image, each pixel having a code value which represents the color 408 of the image at that pixel. In this example, the code values are provided as a back value 402, a front value 404, and a through value 406, which in combination represent the color 408 of the image at that pixel. After applying the spatial transformation, one or more pixel code values are altered by an amount Δ, as shown in FIG. 4b. However, as can be seen by comparing FIG. 4a with FIG. 4b, not all of the code values are altered. In particular, the code values corresponding to colors a, c, and d are altered by various amounts Δ. However, the code values for color b are not altered at all. The reason color b is not altered by the biased spatial transformation is because this color had been previously identified as being adversely affected by spatial transformations. Accordingly, the adverse affects are avoided by not applying the spatial transformation to the pixels having code values which represent color b (or a variant of color b).

Figure 5:
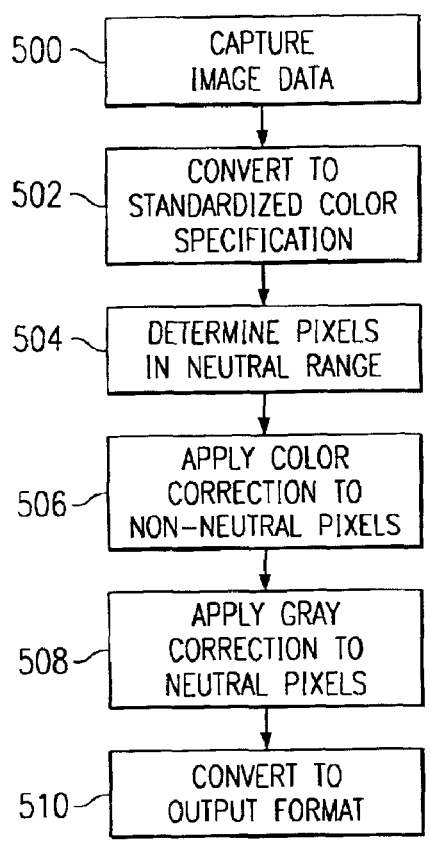
FIG. 5 is a flow diagram illustrating a method for selectively applying a color correction transformation to non-neutral pixels, according to one embodiment of the invention.

FIG. 5 is a flow diagram illustrating a method for selectively applying a color correction transformation to non-neutral pixels, according to one embodiment of the present invention. In this embodiment of neutral pixel sequestering, the image data is captured at step 500. Then, this data is converted to a standardized color format, at step 502. For example, the data can be converted to the CIE L*a*b* color space, such as by using an appropriate transformation matrix equation. Then, at block 504, it is determined which pixels are in the predetermined neutral range. For example, in the L*a*b* color space, gray pixels have a* and b* values which are very near to zero. However, a color correction method might change these values such that they become tinted toward particular colors. Thus, pixels having a* and b* values within a certain range of zero should be sequestered.

The process then continues to step 506 and the non-neutral pixels can be color corrected. In the L*a*b* example, those pixels having a* or b* values outside of the neutral range can be color corrected. Again, this biased color correction transformation can occur in a number of manners, such as on a selective pixel-by-pixel basis for example, or by correcting the entire image data set and returning the pixels within the range to their original values.

While the non-neutral pixels are color corrected, either a different correction transformation can be applied to the neutral pixels, or no correction transformation can be applied. In the embodiment of FIG. 5, the neutral pixels are corrected according to a gray-correction transformation which provides better separation between the neutral pixels and the colored pixels. This is shown at block 508 of FIG. 5. In the L*a*b* example, the pixels having a* and b* values within the predefined range near zero can have their a* and b* values brought closer to zero, to force these pixels to appear more gray.

Once the corrections have been completed on the pixels, the pixel color code values can be converted to the appropriate output data format for the output device on which the image will be formed. This step is shown as block 510 of FIG. 5

Figure 6:
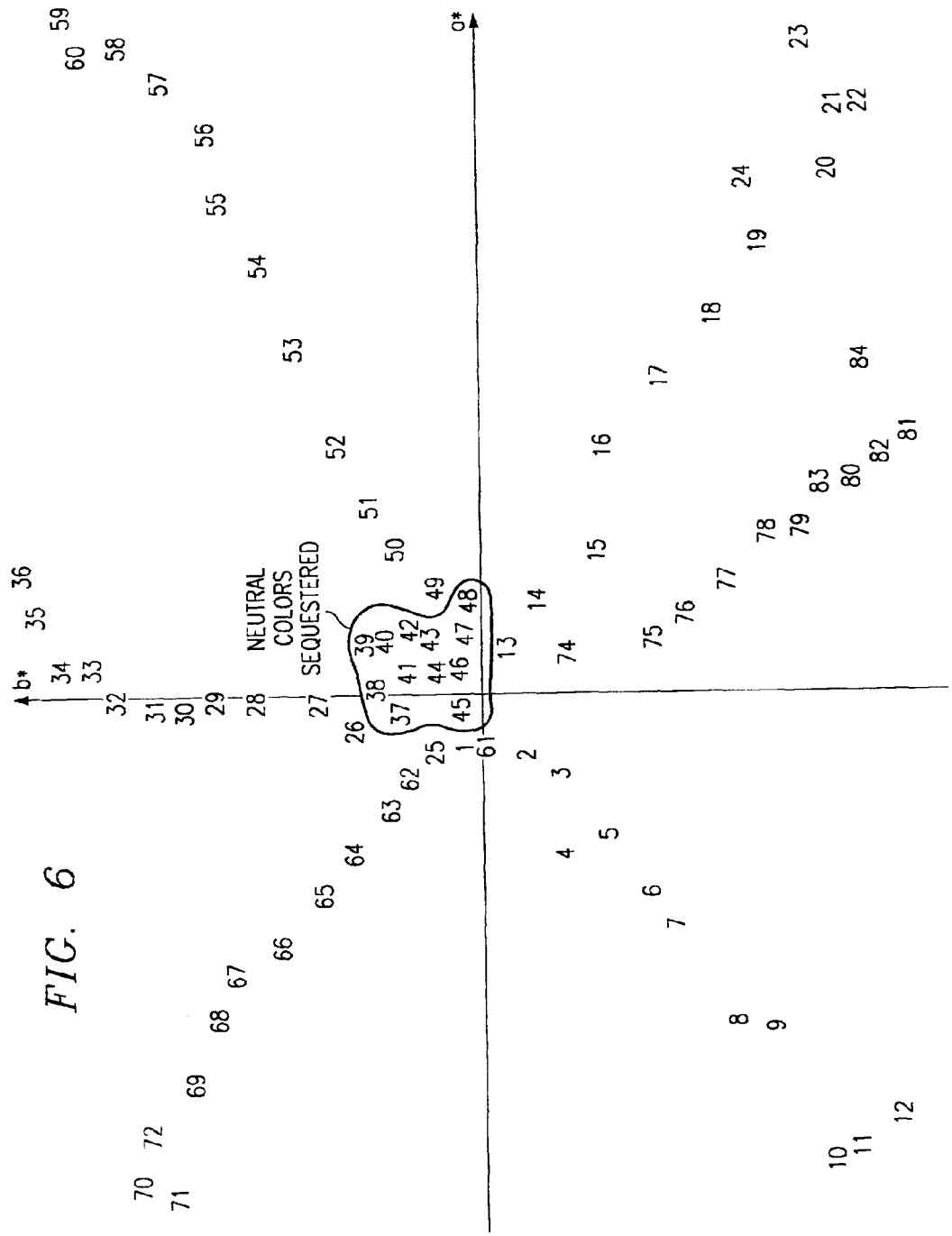
FIG. 6 is a graph illustrating neutral pixel locations in an exemplary color space prior to the operation of FIG. 5.
Figure 7:
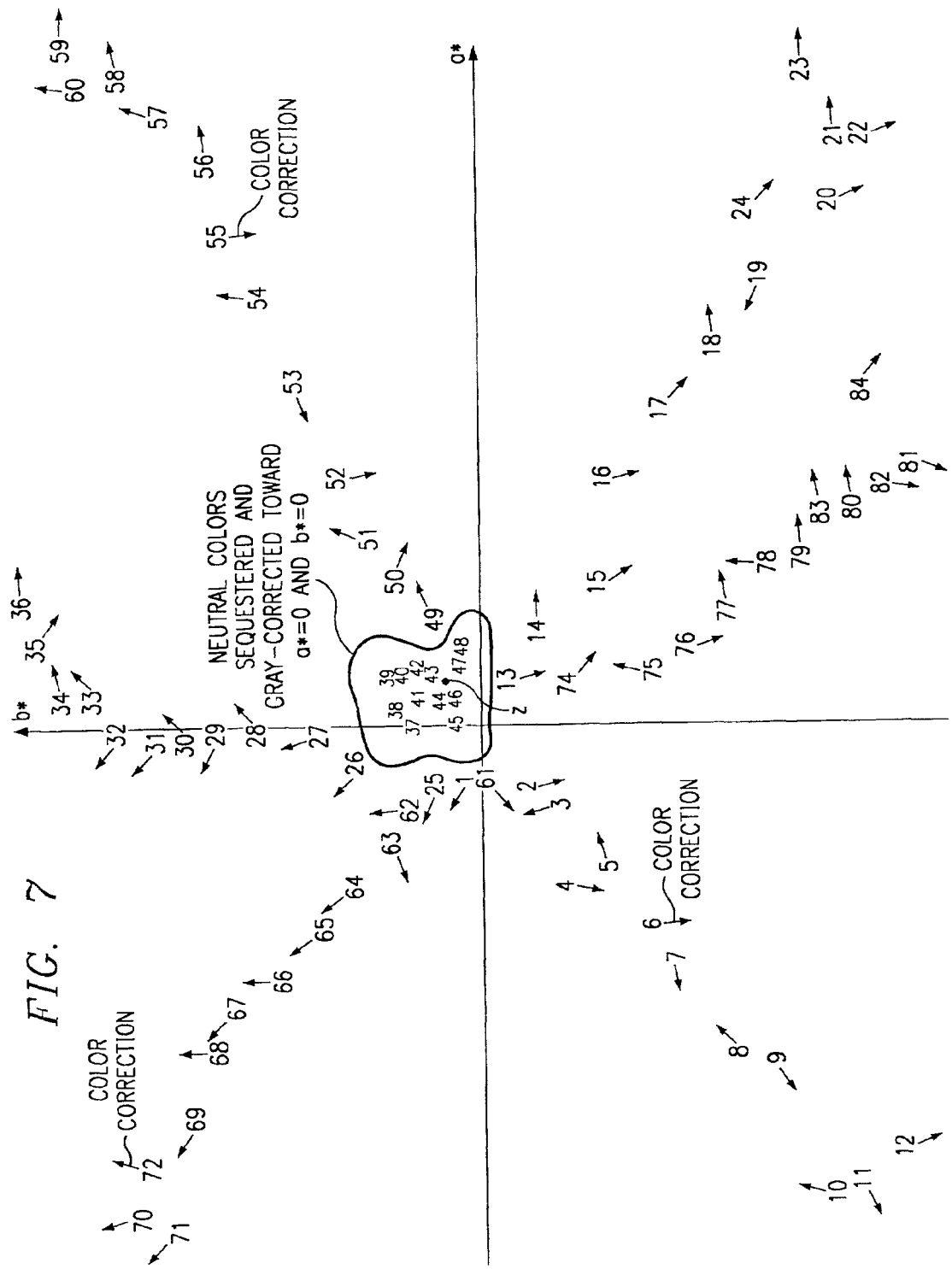
FIG. 7 is a graph illustrating neutral pixel locations in the exemplary color space subsequent to the operation of FIG. 5.

FIG. 6 is a graph illustrating an example of neutral pixel a* and b* values prior to the transformation of FIG. 5, and FIG. 7 is a graph illustrating these exemplary neutral pixel a* and b* values subsequent to the transformation of FIG. 5. Each graph is a plot of a* values versus b* values for a plurality of colors. (The L* axis is not shown). More specifically, each number on the graphs represent the mean a* and b* values for one of 84 target color patches scanned from a standard color target film, such as by using the scanning system of FIG. 2. The colors represented by these 84 numbers are various saturations of cyan, magenta, yellow, gray, red, green, and blue. It is known from the target film that the gray patches are colors 37–48. While these colors should have a* and b* values very close to zero, as shown in FIG. 6, these colors deviate from the point (0, 0). Thus, some of these colors may actually appear tinted towards red. Also, in some imaging systems, such neutral colors can appear tinted towards green and magenta.

According to one embodiment of neutral pixel sequestering, any pixel having code value which represents one of the neutral colors 37–48 are exempted from the color correction which occurs to pixels having one of the other code values. These colors can be discriminated because they have a* and b* values within certain ranges. As shown in FIG. 7, any pixels representing neutral colors 37–48 have been subjected to a gray-correction transformation which moves their a* and b* values closer to a point z which is near the point (0,0). As an alternative, all of these pixels can be moved to the same point z. In contrast, any pixels representing other colors are subjected to a color correction transformation to adjust their L*, a*, and/or b* values. The application of the color correction transformation is shown by the arrows in FIG. 7. This is an example of an embodiment where the gray colored pixels are not only exempted from the color correction transformation, but actually subjected to a separate gray-correction transformation to enhance their gray appearance.

Figure 8:
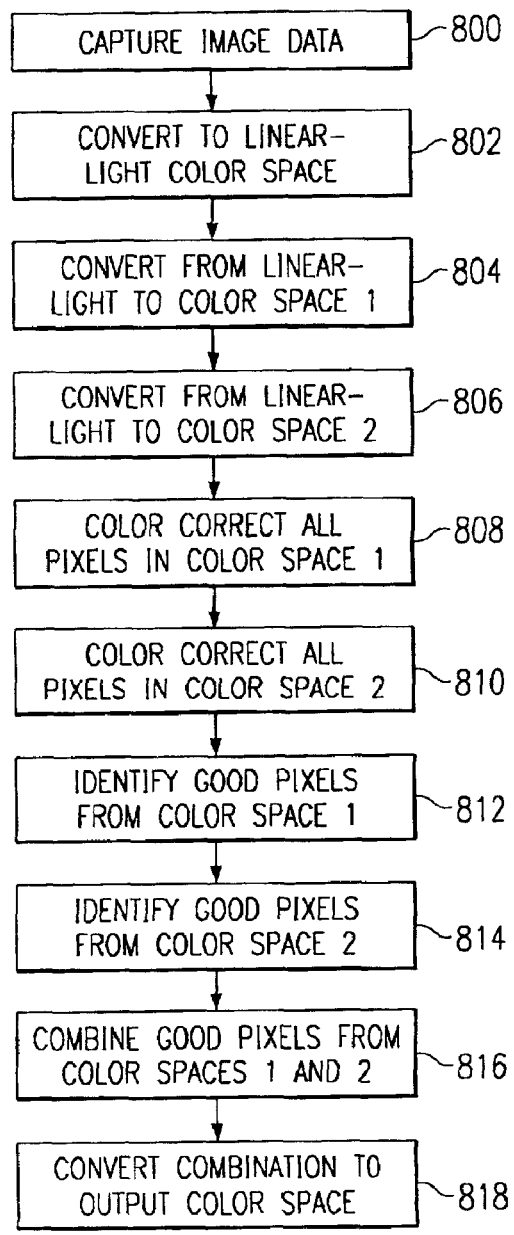
FIG. 8 is a flow diagram illustrating a method for applying color correction transformations in two separate color spaces and combining pixels from the two spaces after the operation, according to another embodiment of the present invention.

FIG. 8 is a flow diagram illustrating a transformation method for applying color correction in two separate color spaces and combining pixels from the two spaces after the transformation, according to an embodiment of the present invention. In this embodiment, the image data is captured at step 800, such as in a BFT format for example. Then, the data is converted to a linear-light color space, such as the linear RGB space for example, at step 802, using a transformation equation. From this linear-light color space, the data is converted to two other color spaces: Color Space 1 and Color Space 2. The conversion from the linear-light space to Color Space 1 is shown at block 804 of FIG. 8, and the conversion from the linear-light space to Color Space 2 is shown at block 806 of FIG. 8. Accordingly, each pixel in the image data has two sets of code values, one set being in Color Space 1 and the other set being in Color Space 2.

Then, color correction is applied to all of the pixel code values in Color Space 1. This step is shown at block 808 of FIG. 8. Similarly, color correction is conducted on all of the pixel code values in Color Space 2. This is shown at block 810 of FIG. 8.

The color correction process of block 808 may be carried out by scanning in a medium having target color patches and comparing the color difference between the captured code values (which are in Color Space 1) and the target code values (which are also in Color Space 1). Color correction coefficients for Color Space 1 can then be calculated, and equations, matrices, and/or look-up tables can then be established to carry out the color correction on the pixel code values in Color Space 1. A similar color correction process can be conducted for the color correction transformation of block 810, except that the captured code values, the target code values, and the established correction coefficients and algorithms are in Color Space 2.

However, the color corrections conducted in steps 808 and 810 may have adverse affects on certain pixels in Color Space 1, and on other pixels in Color Space 2. Subsequently, non-adversely-affected pixels ("good" pixels) are identified from Color Space 1 and from Color Space 2. These steps are shown as blocks 812 and 814 of FIG. 8.

It can be determined by experimentation which color code values will be adversely affected by a given color correction. Any appropriate color difference method or equation can be used to determine whether a given color will deviate adversely deviate from its target color after color correction. For example, Delta E*, Delta L*, Delta H*, and/or Delta C* calculations can be made to determine the color difference between a corrected color code value and its target value.

Accordingly, pixel code values which fall within a certain color range may be identified, in any suitable manner, as being adversely affected by the color correction which is performed in the color space. As an example, the color code values for each pixel can be compared to a color code value range known to be adversely affected by color correction. For instance, if the L*a*b* space is used, it may be desirable to replace all pixels having a b* value greater than 70 and an a* value of approximately zero (i.e., yellow pixels) with another set of pixel code values from another space, because it has been found that color correction can adversely affect yellow pixels when conducted in the L*a*b* color space. Accordingly, prior to color correcting in the L*a*b* space, any pixels with a b* value greater than 70 and an a* value of about zero can be identified and converted to the HSI color space. Color correction for these pixels can then be conducted in the HSI color space, and improved accuracy for yellows results. Thus, for the adversely-affected pixels in Color Space 1, the code values are preferably replaced with color-corrected code values from Color Space 2.

The selection and/or combination of non-adversely affected code values from the two color spaces for the pixels is shown at block 816 of FIG. 8. Once this good data has been selected from each color space, each pixel will have color code values from either Color Space 1 or Color Space 2. These code values can then be converted by a transformation equation to an appropriate output format for image formation, as shown at block 818.

Accordingly, this embodiment achieves maximum color correction of an image and minimizes the adverse affects that can result from color correction transformations. Pixels representing adversely-affected colors have their color code values replaced with color code values from other color spaces where no adverse effects resulted after color correction.

FIG. 9 is a block diagram illustrating an alternative pixel replacement color correction method. In this embodiment, the image is captured in the input color space, at block 900. Preferably, the input color space comprises the BFT color space described above. Then, the method proceeds to convert from the input color space to a first color space, such as the L*a*b* color space, at block 902. As shown in the exemplary pixel map 903, after converting to the first color space, each pixel has L*, a*, and b* code values. For example, pixel 920 represents the upper left corner of the image. The color of the image at this pixel is represented by L*a*b* values in the map 903.

However, some of the pixels, after being converted to the first color space, have a color code value which is in a predefined range that is known to be adversely affected by color correction processing. These pixels are marked with an X in the map 903 of FIG. 9. The pixel 924 is an example of such a pixel. In the L*a*b* example, this pixel might have a b* value greater than 70 and an a* value of around zero, indicating that it is a yellow pixel which can be adversely affected by color correction in the L*a*b* color space. Such pixels can be identified by comparing their color code values to those color code values known to be adversely affected by color correction. This identification step is shown at block 904 of FIG. 9.

The identified pixels can then be converted to a second color space, such as the HSI color space for example. This step is shown at block 906. The result is that each pixel has one set of code values, either from the L*a*b* space or from the HSI space, as shown by the pixel map 907. As shown in the map 907, because the pixel 924 was identified as being an adversely-affected pixel in the L*a*b* space 903, it is re-assigned a corresponding HSI code value, such as by converting its L*a*b* values to corresponding HSI values using an appropriate color space transformation (Alternatively, this pixel could be converted from its original BFT values to HSI values). Similarly, because pixel 922 was identified as an adversely-affected pixel in the first color space 903 (e.g., L*a*b* space), it is converted to a second color space value (e.g., an HSI value).

Thus, the map 907 contains no pixel code values which are known to be adversely affected by color correction processing in the first color space. Rather, the adversely-affected pixels have been transformed from the first color space to the second color space. Accordingly, each pixel in the map 907 has color code values from either the first color space or the second color space. Thus, more accurate and higher quality color correction can be achieved.

Once the code values have been converted at step 906, color correction (and/or spatial processing) is conducted, such as by correcting the HSI and L*a*b* pixel values using a suitable color correction look-up table, matrix transformation, or equation. In particular, the pixels having L*a*b* values are corrected using an appropriate L*a*b* color correction transformation, as shown at block 908. Similarly, the pixels having HSI values are corrected using an appropriate HSI color correction transformation, as shown at block 909. The resulting pixel map 911 has corrected color code values, each pixel having a corrected value from either the first or the second color space.

After this image enhancement processing, the resulting pixel code values can then be converted to the appropriate output format, such as an RGB format, for example. This step is shown at block 910. A suitable transformation can be used to move the pixel data from the HSI space to the RGB space or from the L*a*b* to the RGB space (depending on the pixel), such as the transformation equations known in the art. In the example of FIG. 9, pixel 920 will need to be transformed from the L*a*b* space to the RGB space, while pixels 922 and 924 will need to be transformed from the HSI space to the RGB space.

The various exemplary methods described above can be implemented in a number of ways, such as by providing a set of software instructions on a computer readable medium, or by providing a programmable apparatus having executable instructions suitable for carrying out the steps stored in a RAM and/or ROM.

The foregoing descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, methods, systems, configurations, and potential applications have been described, it should be understood that many variations and alternatives could be utilized without departing from the scope of the invention. Moreover, although a variety of potential configurations and components have been described, it should be understood that a number of other configurations and components could be utilized without departing from the scope of the invention.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A method for enhancing an image represented by a plurality of pixels, the method comprising:
   obtaining color code values for each of a plurality of pixels;
   determining whether a pixel has a color code value within a predetermined range, wherein the predetermined range has been identified as being adversely affected by a first processing transformation; and
   applying the first processing transformation to the pixel only if it does not have a color code value which falls within the range.

2. The method as recited in claim 1, wherein the first processing transformation comprises a spatial processing transformation.

3. The method as recited in claim 1, wherein the first processing transformation comprises a color correction transformation in a first color space.

4. The method as recited in claim 1, wherein the predetermined range comprises color code values representing yellow colors.

5. The method as recited in claim 1, wherein the color code values comprise L*a*b* color space values.

6. The method as recited in claim 1, wherein the first processing transformation comprises a noise reduction transformation.

7. The method as recited in claim 6, wherein the noise reduction transformation comprises a sharpening operation.

8. The method as recited in claim 1, wherein the steps are conducted by a digital film processing system.

9. The method as recited in claim 1, wherein the steps are conducted by an image scanner system.

10. The method as recited in claim 1, further comprising:
    applying a second processing transformation to the pixel if it does have a color code value which falls within the range.

11. A method for enhancing an image represented by a plurality of pixels, the method comprising:
    applying light to a film medium which includes an image;
    recording at least one value representing the amount of light from the film medium;
    transforming the at least one value to a set of code values representing a color;
    determining whether the color falls within a predetermined color range, wherein the predetermined color range has been identified as being adversely affected by a first image enhancement transformation; and
    applying the first image enhancement transformation to the set of code values only if the color does not fall within the predetermined color range.

12. The method as recited in claim 11, wherein the first image enhancement transformation comprises a spatial transformation.

13. The method as recited in claim 11, wherein the predetermined color range comprises color values representing yellow colors.

14. The method as recited in claim 11, wherein the predetermined color range comprises color values representing achromatic colors.

15. The method as recited in claim 11, wherein the at least one value represents the amount of light reflected from the front of the film medium, and wherein the transforming step comprises:
    recording a back value representing the amount of light reflected from the back of the film medium;
    recording a transmitted value representing the amount of light transmitted through the film medium; and
    transforming the front, hack, and transmitted values to the set of code values.

* * * * *